Aug. 17, 1948.                D. C. CAMPION, SR                2,447,393
                               SHUFFLE CONVEYER
Filed April 26, 1945                                        3 Sheets-Sheet 2
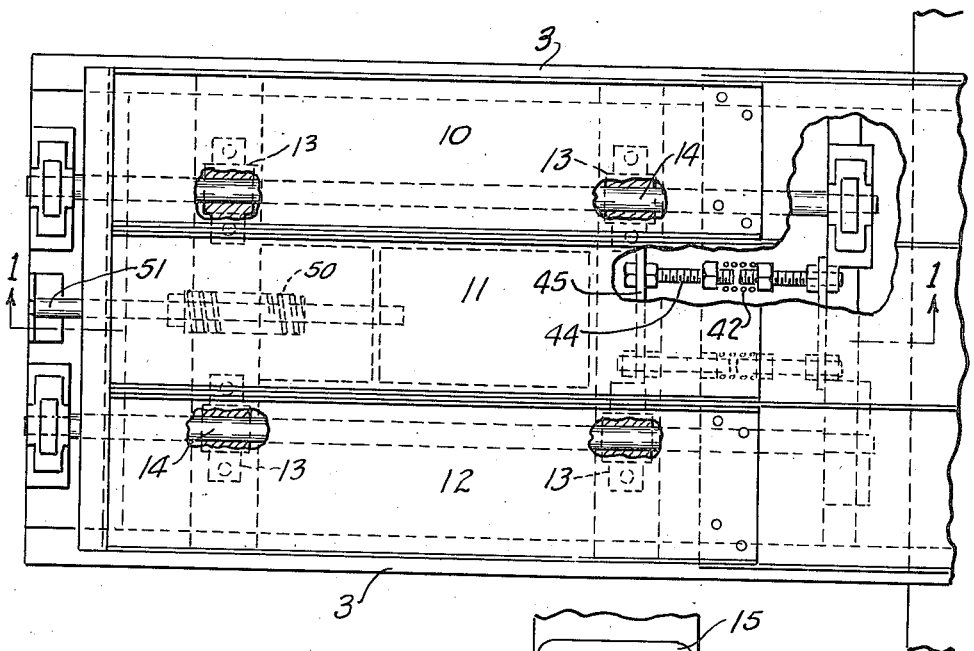
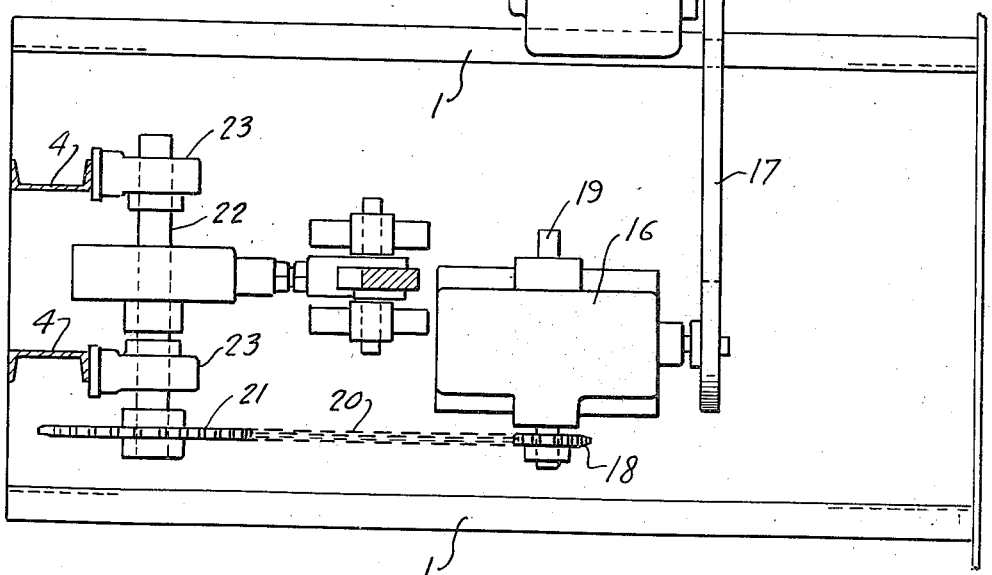
INVENTOR.
Donald C. Campion, Sr.
BY
Barnes, Kisselle, Laughlin & Raisch
Attorneys

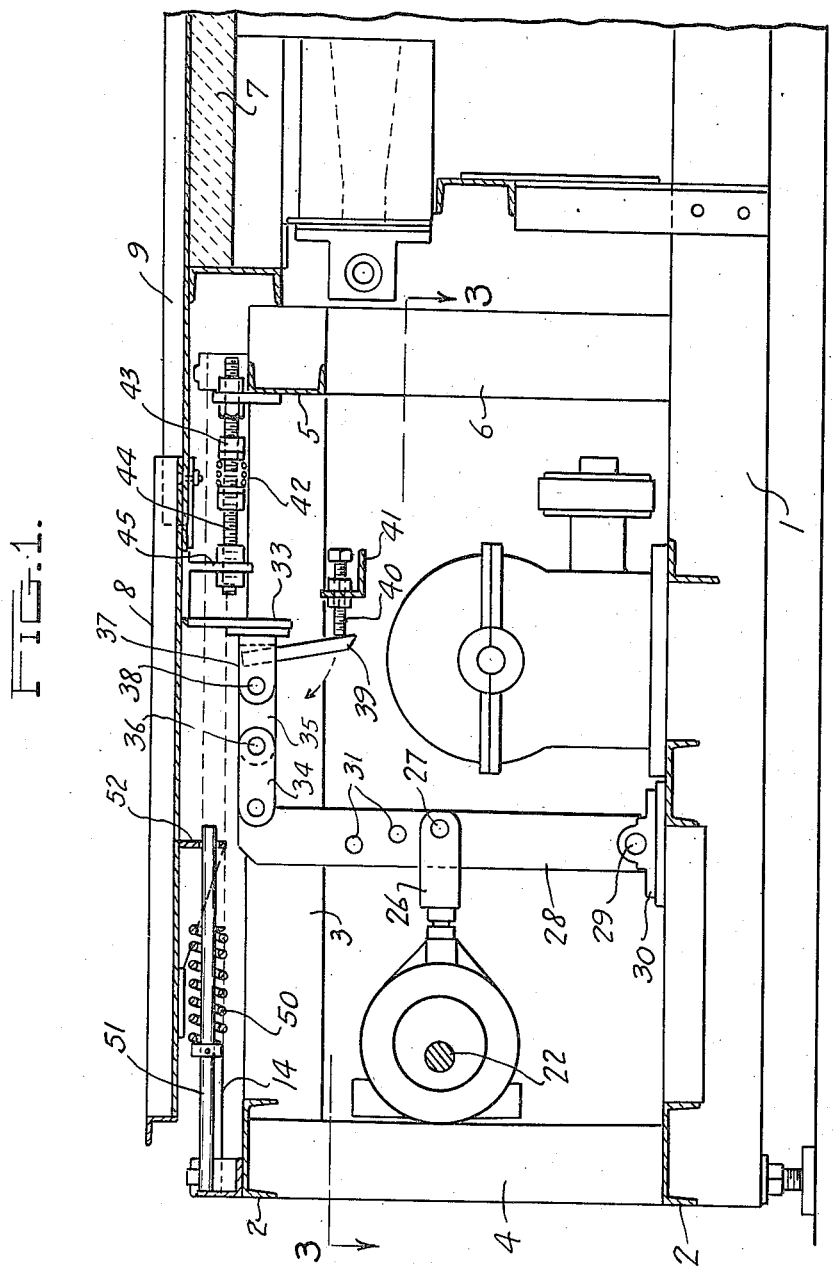

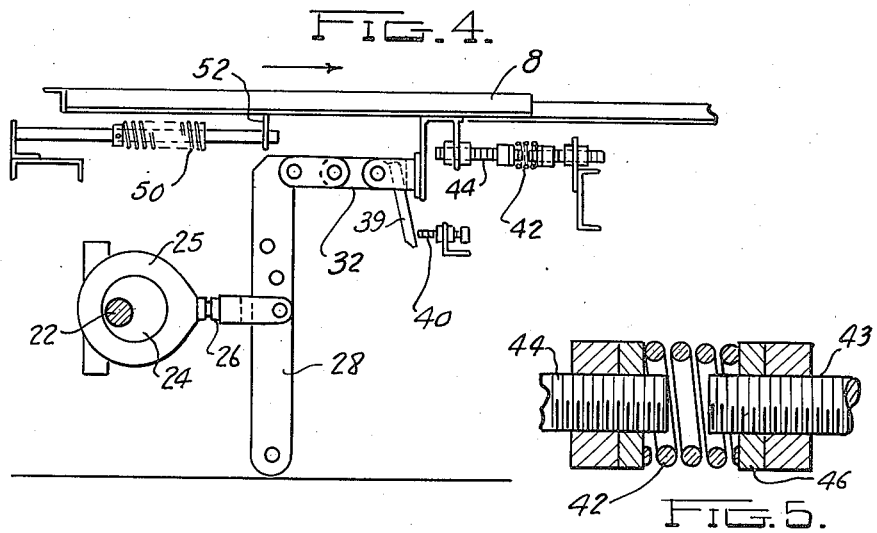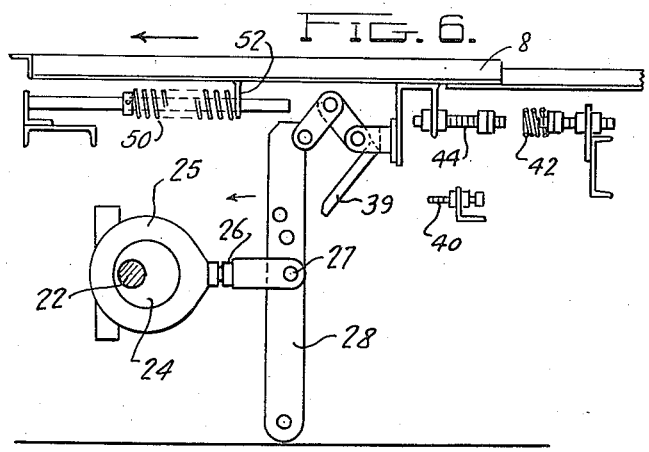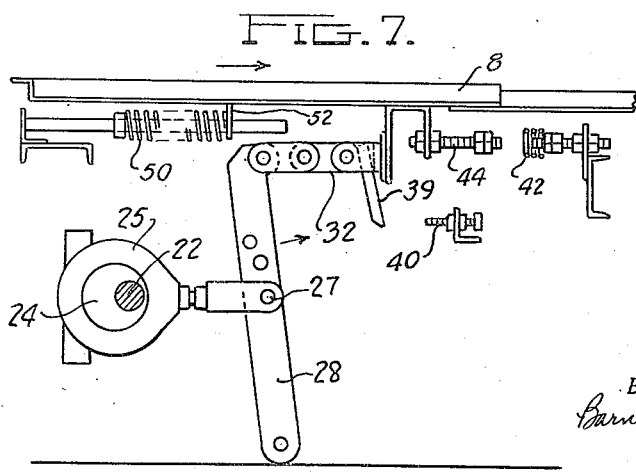

Patented Aug. 17, 1948

2,447,393

UNITED STATES PATENT OFFICE 2,447,393

SHUFFLE CONVEYER

Donald C. Campion, Sr., Detroit, Mich., assignor to Loftus Engineering Corporation, Pittsburgh, Pa., a corporation of Maryland Application April 26, 1945, Serial No. 590,347

7 Claims. (Cl. 198—220)

This invention relates to a shuffle conveyor.

It is the object of this invention to produce a shuffle conveyor which is efficient and economical in operation.

The invention contemplates in particular a conveyor that is adaptable for many uses and which will handle or convey a wide diversity of parts ranging from paper clips to heavy forgings.

Another advantage of my conveyor is that when the conveyor is used, e. g., with a heat treating furnace, the driving parts can be positioned without the furnace and away from the furnace heat so that they will not get hot.

My invention also contemplates a shuffle conveyor whose speed can be accurately timed and varied over an extremely wide range.

Fig. 1 is a longitudinal vertical section showing my shuffle conveyor taken along the line 1—1 of Fig. 2.

Fig. 2 is a top plan view of my shuffle conveyor.

Fig. 3 is a horizontal section taken along the line 3—3 of Fig. 1.

Fig. 4 is a detail showing the mechanism for reciprocating the conveyor pan and with the conveyor pan in its forwardmost position.

Fig. 5 is a detail of the spring mechanism for jerking the pan from under the load.

Fig. 6 is a view similar to Fig. 4 but showing the conveyor pan on its rearward stroke.

Fig. 7 is a view similar to Fig. 4 but showing the conveyor pan at the beginning of its forward movement.

Referring more particularly to the drawings the frame of my shuffle conveyor comprises a pair of bottom rails 1, top and bottom front cross rails 2, a pair of front posts 4, a pair of top rails 3, top and bottom rear cross rails 5, and a pair of rear support posts 6. The frame members are welded or otherwise secured together.

For purposes of description my conveyor is shown in conjunction with a heat treating furnace having a hearth 7 of any suitable material, such as clay, silicon carbide, mullite or a cast alloy, but it is understood that my shuffle conveyor has numerous other uses besides conveying work through heat treating furnaces.

The pan of the conveyor is designated 8. The conveyor pan 8 is provided with a front extension 9 which is bolted or otherwise affixed thereto. It is understood that pan 8 and extension 9 can be fabricated as a single integral pan. Extension 9 rides back and forth directly on the hearth 7. The conveyor can be provided with a single conveyor pan 8 but in case it is desired to convey and maintain separate a plurality of different kinds of work, or for any other reason, the conveyor pan can be divided into a plurality of parts. As shown, the conveyor pan 8 is divided into conveyor sections 10, 11 and 12 which are secured together and in effect form separate conveyor pans or a single conveyor pan provided with longitudinal partitions.

The conveyor pan 8 is supported fore and aft upon slide blocks 13 which slide upon stationary rails or rods 14. Rods 14 are parallel and supported at their front and rear ends upon cross rails 2 and 5. Slide blocks 13 are welded, bolted or otherwise secured to the underside of conveyor pan 8. Thus conveyor pan 8 is mounted to reciprocate back and forth on slide rods 14. It is understood that any other suitable construction can be used.

The mechanism for reciprocating conveyor pan 8 comprises an electric motor or any other suitable prime mover 15, a speed reducer or gear reduction transmission 16, when necessary, a drive belt 17 between motor 15 and speed reducer 16, a driving sprocket 18 on the gear reduction shaft 19, a chain 20 by means of which driving sprocket 18 drives driven sprocket 21 on shaft 22 which is journalled in support bearings 23. An eccentric drive is mounted upon shaft 22 and comprises a circular cam or bearing 24 mounted eccentrically on shaft 22, a pitman 26 fixed at one end to a circular bearing block 25 mounted over cam 24 and pivotally connected at its other end by means of pin 27 with oscillating beam 28. Pin 27 engages oscillating beam 28 in one of a plurality of openings 31. Beam 28 is pivotally supported at its lower end by means of shaft 29 on support 30. Beam 28 can be provided with a plurality of holes 31 so that pitman 26 can be pivotally connected to beam 28 in any one of these holes to vary the stroke of beam 28. The upper end of beam 28 is connected by a toggle 32 with a bracket 33 fixed to the underside of pan 8. Toggle 32 comprises link 34 pivoted at one end to the upper end of beam 28 and at its other end to toggle link 35 by means of pin 36. The other end of toggle link 35 is pivotally mounted on a bifurcated bracket 37 by means of pin 38. Bracket 37 is welded or otherwise affixed to bracket 33. Link 35 is provided with a depending arm 39 which, in the forwardmost position of pan 8, is arranged to abut a stop in the form of a screw or cam 40 having a screw fit in fixed support bracket 41.

For jerking pan 8 rearwardly or from under the work there is provided one or more recoil springs 42, Fig. 5. Spring 42 is a compression spring and supported at one end by stationary support 43 fixed on rear cross rail 5. Spring 42 is supported at its forward end by support 44 which is mounted on bracket 45 which in turn is fixed to the underside of pan 8. The right hand end of spring 32 is welded or otherwise anchored to support 43 as at 46. The left hand end of spring 32 abuts support 44 but is not secured thereto.

The operation of my device is as follows: The conveyor pan 8 which can be made in the form of a trough of sheet metal, such as steel, is loaded with the work. The forward position of the pan 8 is illustrated in Figs. 1 and 4. At this time toggle 32 is made and beam 28 is at its forwardmost position. Stop 40 is adjusted so that the lower end of arm 39 abuts stop 40 at the end of the desired forward stroke, that is, the stroke in the direction of flow of the work, as indicated by the arrow, Fig. 4. The forward movement of pan 8 is effected by the clockwise stroke of beam 28, as viewed in Fig. 4, acting through toggle 32. As pan 8 moves forward or to the right, recoil spring 42 is compressed. As soon as toggle 32 is tripped, by abutting stop 40, recoil spring 42 jerks the conveyor pan quickly from under the load. Due to the high compression of spring 42, as soon as toggle 32 is broken, the spring actually jerks the pan 8 to the left from under the load and the inertia of the work or load holds it in its forward position. The inertia of the load overcomes the friction between the load and pan 8 so that the load remains nearly stationary as the pan is jerked back. As the pan is jerked back it rides on slide rods 14 and coil spring 50 mounted on rod 51 serves as a cushion at the end of the quick rearward stroke or jerk of the pan 8 brought about by the recoil of spring 42.

Bracket 52 fixed on the underside of pan 8 contacts the forward end of cushioning spring 50. The rearward travel of the pan is illustrated in Fig. 6. The rotation of drive shaft 22 is, of course, continuous. As eccentric 24 travels from the forward position, Fig. 4, to its rearward position, Fig. 7, beam 28 swings backward or counterclockwise thereby straightening or again making toggle 32. Recoil of spring 50, which is a weak spring, relative to recoil spring 42 tends to move pan 8 forward within the limits of the expanded length of spring 50. However, the major portion of the forward stroke is effected by beam 28 and straightened toggle 32 as cam 24 rotates from the position shown in Fig. 7 to that shown in Fig. 4. This forward movement of the pan 8 is relatively slow so that the friction between the pan and the load overcomes the inertia of the work or load and causes the load to travel forwardly with the pan. Since the pan is jerked quickly from under the load for a distance something less than the length of the stroke of beam 28 and is then slid forwardly carrying with it the load, the result is that the load has moved along the conveyor pan in the direction of flow a distance somewhat less than the length of the stroke of the upper end of beam 28.

The length of the stroke of beam 28 can be shortened by connecting pitman 26 in the uppermost hole 31 and can be increased by connecting the pitman in hole 31, as shown, which is on a horizontal line with shaft 22 and closer to the axis of pivoting of arm 28 than the uppermost hole 31.

If stop 40 is turned so that it is moved to the left, Fig. 1. then toggle 32 will break sooner on the clockwise stroke of beam 28, and if stop 40 is screwed or adjusted rearwardly, toggle 32 will break later in the rearward stroke of beam 28. If stop 40 is moved to the right so that it does not at all contact arm 39, then the toggle will not break and the pan will simply reciprocate with the beam 28 without advancing the work. Thus, by adjusting stop 40 rearwardly or to the left, Fig. 1, the length of the stroke of the conveyor pan is decreased and by adjusting stop 40 to the right or forwardly the length of the stroke of the conveyor pan is increased.

As the length of the stroke of pan 8 increases, the speed at which the load is conveyed is increased and vice versa. The speed of the conveyor can also be varied by connecting a Reeves or other variable speed drive or transmission between motor 15 and speed reducer 16. The term "pan" is used generically to denote a reciprocating support along and upon which the load is shuffled or conveyed.

By having pan 8, 9 rest upon and slide back and forth on the refractory hearth 7, the portion of the conveyor within the furnace is reduced to the ultimate in simplicity and the need for rollers or other supports within the furnace where they are subjected to high temperatures and other destructive forces, is obviated. The pan 8, 9 need only be strong enough to convey the work forward at furnace temperature because the load is actually carried by the hearth upon which the weight of the pan rests.

I claim:

1. A conveyor comprising in combination a pan upon which the work is placed and along which the work is conveyed, oscillating means, and a toggle lever connecting the oscillating means with the pan, said oscillating means and toggle lever when made cooperating to move said pan forwardly in the direction which the work is being conveyed at a relatively slow speed so that the work moves with the conveyor, resilient means arranged to be loaded during the forward movement of said pan, and means for breaking the toggle during the forward stroke of said oscillating means whereby the loaded resilient means reacts to move said pan in the opposite direction at a relatively faster speed sufficient to jerk the pan from under the work whereby for each cycle of operation comprising a forward and reverse movement of the pan the work is advanced a distance less than the stroke of the pan.

2. The combination as set forth in claim 1 including resilient cushioning means for cushioning and arresting the rearward stroke of said pan.

3. A conveyor comprising in combination a pan upon which the work is placed and along which the work is conveyed, oscillating means, and a toggle lever connecting the oscillating means with the pan, said oscillating means and toggle lever when made cooperating to move said pan forwardly in the direction which the work is being conveyed at a relatively slow speed so that the work moves with the conveyor, a spring arranged to be loaded during the forward movement of said pan, and means for breaking the toggle during the forward stroke of said oscillating means whereby the loaded spring reacts to move said pan in the opposite direction at a relatively faster speed sufficient to jerk the pan from under the work whereby for each cycle of operation comprising a forward and reverse movement of the pan the work is advanced a distance less than the stroke of the pan, and a spring opposite the aforementioned spring for cushioning and arresting the rearward stroke of said pan.

4. A conveyor comprising in combination a pan upon which the work is placed and along which the work is conveyed, an oscillating beam, and a toggle lever connecting the oscillating beam with the pan, said oscillating beam and toggle lever when made cooperating to move said pan forwardly in the direction which the work is being conveyed at a relatively slow speed so that the work moves with the conveyor, resilient means arranged to be loaded during the forward movement of said pan, and adjustable means for breaking the toggle during the forward stroke of said oscillating beam whereby the loaded resilient means reacts to move said pan in the opposite direction at a relatively faster speed sufficient to jerk the pan from under the work whereby for each cycle of operation comprising a forward and reverse movement of the pan the work is advanced a distance less than the stroke of the pan, the adjustment of said adjustable means serving to vary the point in the forward stroke of said oscillating beam at which the toggle is broken and the forward stroke of said pan terminated.

5. A conveyor comprising in combination a pan upon which the work is placed and along which the work is conveyed, means constructed and arranged to move to and fro, and a toggle lever connecting the said means with the pan, said means and toggle lever when made cooperating to move said pan forwardly in the direction which the work is being conveyed at a relatively slow speed so that the work moves with the conveyor, resilient means arranged to be loaded during the forward movement of said pan, and means for breaking the toggle during the forward stroke of said first-mentioned means whereby the loaded resilient means reacts to move said pan in the opposite direction at a relatively faster speed sufficient to jerk the pan from under the work whereby for each cycle of operation comprising a forward and reverse movement of the pan the work is advanced forwardly upon said pan.

6. A conveyor comprising in combination a pan upon which the work is placed and along which the work is conveyed, reciprocating means constructed and arranged to reciprocate with a stroke of substantially uniform length, and a toggle lever connecting the reciprocating means with the pan, said reciprocating means and toggle lever when made cooperating to move said pan forwardly in the direction which the work is being conveyed at a relatively slow speed so that the work moves with the conveyor, resilient means arranged to be loaded during the forward movement of said pan, and means for breaking the toggle during the forward stroke of said reciprocating means whereby the loaded resilient means reacts to move said pan in the opposite direction at a relatively faster speed sufficient to jerk the pan from under the work whereby for each cycle of operation comprising a forward and reverse movement of the pan the work is advanced upon said pan a distance somewhat less than the stroke of the pan.

7. The combination as set forth in claim 5 wherein the said means which is constructed and and arranged to move to and fro on its backward stroke makes the toggle lever to effect a driving relation between the pan and the said means on its forward stroke.

DONALD C. CAMPION, Sr.

REFERENCES CITED

The following references are of record in the file of this patent:

UNITED STATES PATENTS

| Number | Name | Date |
|---|---|---|
| 724,054 | Schule | Mar. 31, 1903 |
| 997,235 | Butchort | July 4, 1911 |
| 1,160,427 | Marcus | Nov. 16, 1915 |
| 1,262,922 | Cooley | Apr. 16, 1918 |
| 1,582,127 | Cope | Apr. 27, 1926 |
| 1,843,282 | Horn et al. | Feb. 2, 1932 |

FOREIGN PATENTS

| Number | Country | Date |
|---|---|---|
| 5,672 | Holland | Jan. 15, 1921 |
| 355,795 | Germany | July 3, 1922 |